(12) United States Patent
Avila

(10) Patent No.: US 10,990,913 B2
(45) Date of Patent: Apr. 27, 2021

(54) SYSTEM AND METHOD FOR ELECTRONIC ASSIGNMENT OF ISSUES BASED ON MEASURED AND/OR FORECASTED CAPACITY OF HUMAN RESOURCES

(71) Applicant: BIGFORK TECHNOLOGIES, LLC, Scottsdale, AZ (US)

(72) Inventor: Tanya Avila, Leander, TX (US)

(73) Assignee: BigFork Technologies, LLC, Scottsdale, AZ (US)

(*) Notice: Subject to any disclaimer, the term of this patent is extended or adjusted under 35 U.S.C. 154(b) by 0 days.

(21) Appl. No.: 16/582,650

(22) Filed: Sep. 25, 2019

(65) Prior Publication Data

US 2021/0090000 A1    Mar. 25, 2021

Related U.S. Application Data

(60) Provisional application No. 62/905,291, filed on Sep. 24, 2019.

(51) Int. Cl.
 *G06Q 10/06* (2012.01)
 *G06N 20/00* (2019.01)
 *G06Q 10/10* (2012.01)

(52) U.S. Cl.
 CPC ..... *G06Q 10/063118* (2013.01); *G06N 20/00* (2019.01); *G06Q 10/06398* (2013.01); *G06Q 10/063112* (2013.01); *G06Q 10/105* (2013.01)

(58) Field of Classification Search
 CPC .............. G06Q 10/06; G06Q 10/0631; G06Q 10/063112; G06Q 10/06311

USPC ........................................................ 705/7.17
See application file for complete search history.

(56) References Cited

U.S. PATENT DOCUMENTS

| | | | | |
|---|---|---|---|---|
| 5,903,641 A | * | 5/1999 | Tonisson | H04M 3/5233 379/265.12 |
| 6,970,829 B1 | * | 11/2005 | Leamon | G06Q 10/06 705/7.14 |
| 10,720,072 B2 | * | 7/2020 | Loh | G09B 7/04 |
| 2003/0099343 A1 | * | 5/2003 | Dezonno | H04M 3/5191 379/265.11 |
| 2003/0167199 A1 | * | 9/2003 | Thomann | G06Q 10/10 705/35 |
| 2009/0006164 A1 | * | 1/2009 | Kaiser | G06Q 10/06 705/7.14 |

(Continued)

*Primary Examiner* — Johnna R Loftis
(74) *Attorney, Agent, or Firm* — Dickinson Wright, PLLC; Stephen A. Mason; Jonathan H. Harder

(57) ABSTRACT

A method for capacity forecasting may include determining expected issues by averaging a number of each issue type submitted per a time period to predict a quantity of each issue type that will be submitted in a next time period, determining an expected issue capacity need in the future for each skill level of the assignees based on the expected issues, and determining assignee demand by averaging a number of each issue type assigned to each assignee per the time period. For each assignee, the method may include determining an expected assignee demand by identifying a number of the expected issues on which each assignee will be expected to work based on the expected issues and the assignee demand, determining an expected individual capacity based on the expected assignee demand, and determining assignments of issues to the assignee based on the expected issue capacity and the expected individual capacity.

15 Claims, 10 Drawing Sheets

(56) References Cited

U.S. PATENT DOCUMENTS

| | | | |
|---|---|---|---|
| 2009/0006173 A1* | 1/2009 | Farrell | G06Q 10/06 705/7.13 |
| 2011/0077994 A1* | 3/2011 | Segev | G06Q 10/06 705/7.16 |
| 2014/0215495 A1* | 7/2014 | Erich | G06F 11/3438 719/318 |
| 2014/0358610 A1* | 12/2014 | de Assuncao | G06Q 10/063114 705/7.15 |
| 2015/0030152 A1* | 1/2015 | Waxman | H04M 3/5233 379/265.11 |

* cited by examiner

Computing Device 101

Please set up default values for Skill, Workpoints, and Individual Resource Capacity

| Skill Level | Assignee Level |
|---|---|
| 1 | Entry Level |
| 2 | Junior |
| 3 | Mid-Level |
| 4 | Senior |
| 5 | Expert |

| Workpoint | Amount of Effort |
|---|---|
| 1 | Routine/task based (potential to automate) |
| 2 | Minor decisions with variables, rule based actions |
| 3 | Requires some thoughtful decisions, some collaboration |
| 4 | Requires some expertise or more complex collaboration |
| 5 | Requires a lot of expertise, intersecting decisions, collaboration, and/or multiple steps |

Workpoints

| Skill | 1 | 2 | 3 | 4 | 5 |
|---|---|---|---|---|---|
| 1 | <2 hours | <4 hours | <20 hours | <80 hours | >80 hours |
| 2 | <1 hours | <4 hours | <15 hours | <70 hours | >70 hours |
| 3 | <30 minutes | <2 hours | <15 hours | <60 hours | >60 hours |
| 4 | <15 minutes | <2 hours | <10 hours | <50 hours | >50 hours |
| 5 | <15 minutes | <2 hours | <8 hours | <40 hours | >40 hours |

*FIG. 2*

```
                                                    700
                                                     ⎧
┌──────────────────────────────────────────────────────────┐
│ Determine expected issues by averaging a number of each  │
│ issue type submitted per a certain time period to predict│
│ a quantity of each issue type that will be submitted in  │
│ a next time period                                       │
│                          702                             │
└──────────────────────────────────────────────────────────┘
                              │
                              ▼
┌──────────────────────────────────────────────────────────┐
│ Determine an expected issue capacity need in the future  │
│ for each skill level of the set of assignees based on    │
│ the expected issues                                      │
│                          704                             │
└──────────────────────────────────────────────────────────┘
                              │
                              ▼
┌──────────────────────────────────────────────────────────┐
│ Determine assignee demand by averaging a number of each  │
│ issue type assigned to each assignee of the set of       │
│ assignees per the certain time period                    │
│                          706                             │
└──────────────────────────────────────────────────────────┘
                              │
                              ▼
┌──────────────────────────────────────────────────────────┐
│          For each assignee of the set of assignees       │
│                          708                             │
│  ┌────────────────────────────────────────────────────┐  │
│  │ Determine an expected assignee demand by           │  │
│  │ identifying a number of the expected issues on     │  │
│  │ which each assignee will be expected to work based │  │
│  │ on the expected issues and the assignee demand     │  │
│  │                      710                           │  │
│  └────────────────────────────────────────────────────┘  │
│                          │                               │
│                          ▼                               │
│  ┌────────────────────────────────────────────────────┐  │
│  │ Determine an expected individual capacity based on │  │
│  │ the expected assignee demand                       │  │
│  │                      712                           │  │
│  └────────────────────────────────────────────────────┘  │
│                          │                               │
│                          ▼                               │
│  ┌────────────────────────────────────────────────────┐  │
│  │ Determine assignments of one or more issues to the │  │
│  │ assignee based on the expected issue capacity and  │  │
│  │ the expected individual capacity                   │  │
│  │                      714                           │  │
│  └────────────────────────────────────────────────────┘  │
└──────────────────────────────────────────────────────────┘
```

*FIG. 7*

SYSTEM AND METHOD FOR ELECTRONIC ASSIGNMENT OF ISSUES BASED ON MEASURED AND/OR FORECASTED CAPACITY OF HUMAN RESOURCES

CROSS-REFERENCE TO RELATED APPLICATIONS

The present application claims the benefit of U.S. Provisional Application No. 62/905,291, titled "SYSTEM AND METHOD FOR ELECTRONIC ASSIGNMENT OF ISSUES BASED ON MEASURED AND/OR FORECASTED CAPACITY OF HUMAN RESOURCES" filed Sep. 24, 2019, the content of which is incorporated herein by reference in its entirety for all purposes.

TECHNICAL FIELD

This disclosure relates to human resource management. More specifically, this disclosure relates to a system and method for electronic assignment of issues based on measured and/or forecasted capacity of human resources.

BACKGROUND

Entities, such as corporations, law firms, companies, and/or any business operation, employ human resources to perform various operations for the entities. For example, a corporation may employ numerous in-house attorneys that perform various legal operations, such as reviewing and/or drafting documents (e.g., non-disclosure agreements, contracts, patent applications, trademark applications, copyright applications, and the like). Matters or issues may be received by the corporation in the course of business that need to be completed by one of the in-house attorneys. A matter or issue may refer to a work item related to an operation to perform for the entity. Typically, a manager (e.g., senior in-house attorney) may be responsible for assigning the issues to more junior employees (e.g., junior in-house attorney). Determining the proper employee to which to assign an issue may be a complex task that wastes computer resources and/or is inefficient.

SUMMARY

Representative embodiments set forth herein disclose various techniques for enabling a system and method for electronic assignment of issues based on measured and/or forecasted capacity of human resources.

In one embodiment, a method for capacity forecasting may include determining expected issues by averaging a number of each issue type submitted per a time period to predict a quantity of each issue type that will be submitted in a next time period, determining an expected issue capacity need in the future for each skill level of the assignees based on the expected issues, and determining assignee demand by averaging a number of each issue type assigned to each assignee per the time period. For each assignee, the method may include determining an expected assignee demand by identifying a number of the expected issues on which each assignee will be expected to work based on the expected issues and the assignee demand, determining an expected individual capacity based on the expected assignee demand, and determining assignments of issues to the assignee based on the expected issue capacity and the expected individual capacity.

In some embodiments, a tangible, non-transitory computer-readable medium storing instructions that, when executed, cause a processing device to perform one or more of the operations described above. In some embodiments, a system may include a memory storing instructions and a processor communicatively coupled to the memory. The processor may execute the instructions to perform one or more of the operations described above.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 2 illustrates an example user interface for setting up default values for various parameters according to certain embodiments of this disclosure;

FIG. 7 illustrates example operations of a method for capacity forecasting when assigning issues to a set of assignees according to certain embodiments of this disclosure;

NOTATION AND NOMENCLATURE

Figure 1:
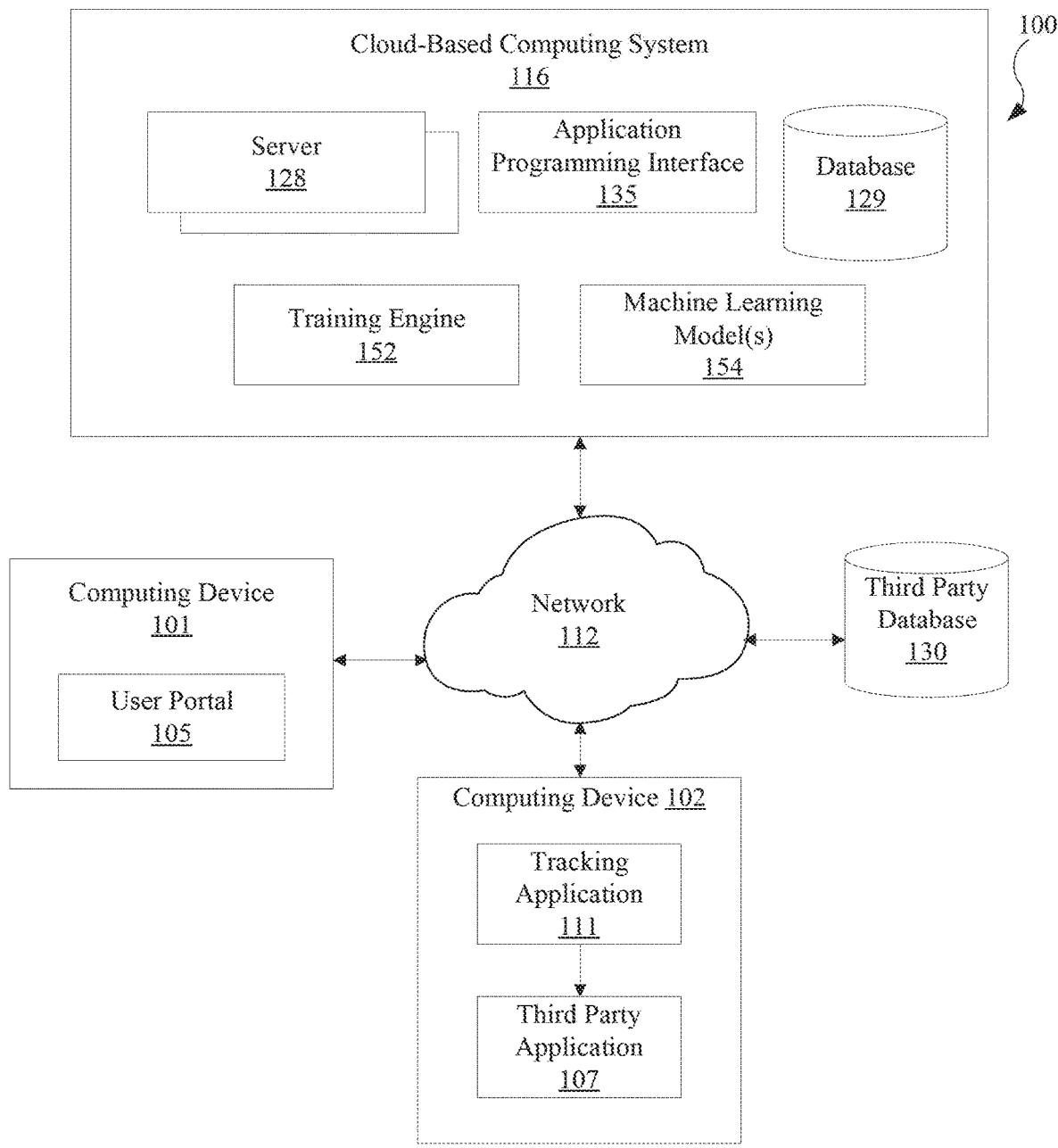
FIG. 1 illustrates a high-level component diagram of an illustrative system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms "matter" and "issue" may be used interchangeably herein.

The term "workpoint" may refer to a complexity of a matter. For example, a workpoint may be assigned to each matter based on an amount of effort required to complete the matter by an assignee having a certain level of experience (e.g., expert).

The term "assignee" may refer to any suitable human resource to which a matter is assigned. In some embodiments, the human resource may be an employee of the entity responsible for completing the issue.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

A work force for an entity may include numerous human resources that each have particular skills to carry out various operations for the entities. As discussed, above a corporation may include various in-house counsels that perform legal operations to complete an issue that is sent to the corporation. Although the following discussion pertains to the corporation setting and determining current capacity allocation, forecasting future capacity needs with the current in-house counsels, and assigning issues to in-house counsels accordingly, it should be noted that the disclosed embodiments may apply to other types of entities and human resources. For example, in a law firm, partners, associates, paralegals, administrators, secretaries, receptionists, and the like may perform operations to complete an issue that is sent to the law firm. In any service industry (e.g., health, finance, education, hospitality, transportation, etc.), there are various entities with various human resources that perform operations to complete issues sent to those entities.

As discussed above, determining the proper human resource to which to assign an issue may be inefficient. For example, an assignor (e.g., a person employed as a manager) may have little visibility into the number of issues assigned to an assignee, a skill level of the assignee, the actual effort required to perform each issue assigned to the assignee, the amount of time that it takes to complete each issue assigned to the assignee, and/or the total volume of outstanding issues. These various factors may contribute to the decision of whether to assign a new issue that is received by the entity to a particular assignee. The assignor may have access to a docketing system to view the issues assigned to a particular assignee. However, the amount of effort required to complete the issues and/or the amount of time it may take to complete the issues assigned to the assignee may not be readily apparent. As such, the assignor may select an assignee that has the least amount of issues assigned to them to work the new issue, even though the issues assigned to that assignee may require far more effort and time to complete than the issues assigned to another assignee. Thus, the assignee may not be able to attend to the newly assigned issue as quickly as the other assignee would be able to, thereby leading to inefficiencies in completing the issue. Delayed completion of issues may lead to dissatisfied clients and/or customers, which may lead to loss of business. In addition, the determination of who to assign the issue to by the assignor may take an undesirable amount of time, further adding to the inefficiencies.

Further, determining the proper human resource to which to assign an issue may waste computer resources. For example, an assignor may use a computing device to perform numerous queries to a server to determine the number of issues currently assigned to each assignee, the total number of issues outstanding, the job title (e.g., entry level employee, mid-level employee, senior level employee, etc.) of each assignee, and so forth. The assignor may also use the computing device to perform queries to determine the details of various issues assigned to each of the assignees in an attempt to determine which assignee to which to assign the new issue. These queries may waste processing and/or memory resources of the computing device and/or the server, as well as network resources.

Also, objectively determining a skill level of a human resource may present a technically challenging problem because a credential of the human resource may not accurately represent their actual skill level and the skill level of the human resource may change over time. Moreover, determining the time it takes to complete issues having a certain complexity by an assignee having a certain skill level may also be technically challenging.

Accordingly, aspects of the present disclosure generally relate to electronic assignment of issues based on measured and/or forecasted capacity of human resources. Some embodiments of the present disclosure determine the current allocation of issues to human resources of an entity and the future needs for allocation of issues to the human resources of the entity. There may be various factors that are considered with measuring the capacity of a work force. For example, the factors may include the workpoints (e.g., complexity of each issue), the skill level of the human resource, the amount of time it takes to complete an issue, and/or a volume of issues.

In some embodiments, an administrator may set up default values for the factors or the default values may be preprogrammed. For the workpoints, a weighted value may be assigned to each type of issue to represent the amount of effort required to complete the issue by a person having a certain skill level (e.g., expert). In some embodiments, a total number of issues assigned to each assignee may be determined, as well as a total workpoints for the issues assigned to each assignee. A processing device may analyze the total number of issues relative to the total workpoints to electronically assign a new issue to an assignee. In some embodiments, such a technique may result in an assignee, who is assigned more issues than another assignee, being assigned the new issue if their workpoints is lower than the workpoints of the other assignee.

The currently open issues and their workpoints for each assignee may be tracked and presented in a report. Further, a cumulative amount of workpoints for issues completed by each assignee may be tracked over a certain time period and presented in a report. Various other reports may present how many issues having each workpoint were received in a certain time period, and/or how many issues having each workpoint were received by each department in the certain time period. Various actions may be performed based on the metrics presented in the reports. For example, if there is a large number of issues having a high workpoint for a department in the certain time period, a human resource having a high skill level may be recommended to be hired to accommodate the issues with the high workpoints.

In some embodiments, the factors may be used to determine a current capacity allocation and an available capacity of the available human resources (e.g., assignees). Current capacity allocation may refer to the current assigned individual resource capacity. The individual resource capacity may refer to an expectation per issue type in an allotted amount of time based on a combination of workpoints and skill level. For example, the higher the workpoints (e.g., a complex issue) and the lower the skill level (e.g., a junior level human resource), the lower the individual resource capacity. The current capacity allocation and the available capacity may be used to electronically assign new issues and/or outstanding issues to the assignees.

Further, some embodiments may enable capacity planning by determining the current allocation of issues to human resources and forecasting what the future needs for human resource allocation for expected issues may be. The workpoints of each issue type may be used in the techniques for capacity planning. In some embodiments, a machine learning model may be trained to electronically assign issues to assignees based on the skill level of the assignees, the workpoints associated with the type of issues, volume of issues in a certain time period, tracked history of certain data for the assignees (e.g., actual amount of time an assignee spends on issue types having respective workpoints, and so forth. A tracking application may be installed and executing on the computing devices of the assignees to track amounts of time that the assignees spend completing issues. The tracking application may monitor the amount of time the assignee actively uses various applications working on the issues and transmit the data including the amount of time to a cloud-based computing system. The machine learning model may be trained to update a skill level of an assignee based on the amount of time it takes the assignee to complete and issue having a certain workpoint. Further, the tracking application may monitor an amount of time assignees of certain skill levels (e.g., expert, entry level, junior level, etc.) take to complete issues having certain workpoints, and the machine learning model may be trained to modify expected time allotments to complete those types of issues based on the monitored amount of time.

Analysis may be performed by analyzing the growth of issues over certain time periods (e.g., weekly, monthly, quarterly, annually). For example, if five percent more issues are being received quarter over quarter, a projection may be made of how many issues are going to be received in six months. Further, the average workpoints of the expected issues may be determined based on the historical workpoints of the types of issues received quarter over quarter. As a result, based on the current human resources that are available, a prediction may be made whether the expected issues having the averaged workpoints can be staffed appropriately. If there are more expected issues of a certain workpoint than there are available human resources having a skill level to handle those expected issues, then a recommendation may be made to hire at least one additional human resource having that skill level to handle those expected issues.

The disclosed techniques provide numerous benefits over conventional systems. The techniques may improve efficiency of assigning issues having certain workpoints to the proper assignee having the appropriate skill level and bandwidth to complete the issue in a timely manner. Further, since the assignments may be performed electronically, an assignor may not have to perform the numerous queries described above to assign issues to assignees. As a result, computing resource consumption may be reduced by reducing the queries involved when the assignor is assigning the issues. In addition, a technical solution may be provided to objectively determining the skill level of an assignee by harvesting data from the computing device of the assignee as they complete issues. To that end, harvesting data from the computing device of the assignee may also provide a technical solution to measuring the time it takes to complete issues having a certain complexity by an assignee having a certain skill level.

FIG. 1 illustrates a high-level component diagram of an illustrative system architecture 100 according to certain embodiments of this disclosure. In some embodiments, the system architecture 100 may include a computing device 101, a computing device 102, a cloud-based computing system 116, and/or a third party database 130 that are communicatively coupled via a network 112. As used herein, a cloud-based computing system refers, without limitation, to any remote or distal computing system accessed over a network link. Each of the computing device 101 and computing device 102 may include one or more processing devices, memory devices, and network interface devices.

The network interface devices of the computing devices 101 and 102 may enable communication via a wireless protocol for transmitting data over short distances, such as Bluetooth, ZigBee, near field communication (NFC), etc. Additionally, the network interface devices may enable communicating data over long distances, and in one example, the computing device 101 and/or 102 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The computing device 101 may be any suitable computing device, such as a laptop, tablet, smartphone, or computer. The computing device 101 may include a display that is capable of presenting a user portal 105. The user portal 105 may be implemented in computer instructions stored on a memory of the computing device 101 and executed by a processing device of the computing device 101. The user portal 105 may be a stand-alone application that is installed on the computing device 101 or may be an application (e.g., website) that executes via a web browser. The user portal 105 may present various user interface screens to a user that enable the user to login; setup default values for skill levels, workpoints for types of issues; time allotments for combination of skill levels and workpoints, etc.; view various reports pertaining to current human resource allocations to issues, total workpoints that are currently open for issues assigned to the human resources, cumulative workpoints of issues closed for a certain time period, number of issues having certain workpoints assigned to each department, cumulative number of issues having certain workpoints received in a certain time period, available capacity of each assignee, expected individual resource capacity demand for each assignee, expected issue capacity having certain workpoints need by skill level; assignments of issues to assignees; recommendations of hiring additional human resources.

The computing device 102 may execute a third party application 107. The third party application 107 may be implemented in computer instructions stored on the one or more memory devices of the computing device 102 and executable by the one or more processing devices of the computing device 102. The third party application 107 may be any suitable software application that is capable of completing an issue. For example, the third party application 107 may be a word processing application, spreadsheet application, slideshow application, software development application, animation application, video editing application, or the like.

The computing device 102 may also execute a tracking application 111. The tracking application 111 may be implemented in computer instructions stored on the one or more memory devices of the computing device 102 and executable by the one or more processing devices of the computing device 102. The tracking application 111 may be provided by the cloud-based computing system 116 during setup of the computing device 102 when the assignee of the computing device 102 begins employment at an entity, or at any suitable time. The tracking application 111 may track amounts of time the assignee takes to complete issues using the third party application 107. The tracking application 111 may transmit data including the amounts of time it takes an assignee to complete issues to the cloud-based computing system 116 for analysis. The tracking application 111 may monitor an amount of time the third party application 107 is actively executing and a document is open in the third party application 107. In some embodiments, the tracking application 111 may analyze metadata (e.g., file name, document type, etc.) of documents open in the third party application 107 to determine the assignee is working on an issue. In some embodiments, the cloud-based computing system 116 may determine the amount of time it takes an assignee to complete an issue based on the data received from the tracking application 111 when the issue changes status to a completion state (e.g., "closed") by computing a cumulative amount of time the user worked on the issue using the data.

In some embodiments, the cloud-based computing system 116 may include one or more servers 128 that form a distributed, grid, and/or peer-to-peer (P2P) computing architecture. Each of the servers 128 may include one or more processing devices, memory devices, data storage, and/or network interface devices. The servers 128 may be in communication with one another via any suitable communication protocol. The servers 128 may determine the current allocation of human resources to issues and the future needs for allocation of human resources to expected issues, among other things, based on data stored in a database 129 of the cloud-based computing system 116. The data may include the values of the skill level, workpoints, time allocations; information pertaining to human resources (e.g., name, identity, skill level, amount of time it takes the human resource to complete issues of varying workpoints, etc.); the issues assigned to the human resources; information pertaining to outstanding and/or completed issues (e.g., an identities of the assignees to which the issues are assigned, issue types, number of issues, workpoints of the issues, etc.); the statuses (e.g., open, closed, pending, etc.) of the issues; and so forth.

In some embodiments, the cloud-based computing system 116 may include a training engine 152 and/or one or more machine learning models 154. The training engine 152 and/or the one or more machine learning models 154 may be communicatively coupled to the servers 128 or may be included in one of the servers 128. In some embodiments, the training engine 152 and/or the machine learning models 154 may be included in the computing device 101 and/or 102.

The one or more of machine learning models 154 may refer to model artifacts created by the training engine 152 using training data that includes training inputs and corresponding target outputs (correct answers for respective training inputs). The training engine 152 may find patterns in the training data that map the training input to the target output (the answer to be predicted), and provide the machine learning models 154 that capture these patterns. The set of machine learning models 154 may comprise, e.g., a single level of linear or non-linear operations (e.g., a support vector machine [SVM]) or a deep network, i.e., a machine learning model comprising multiple levels of non-linear operations. Examples of such deep networks are neural networks including, without limitation, convolutional neural networks, recurrent neural networks with one or more hidden layers, and/or fully connected neural networks.

In some embodiments, the training data may include inputs of amounts of time that it takes to complete certain types of issues having certain workpoints and correlated outputs of skill levels to assign an assignee. The training data may also include other inputs, such as human resources with skill levels, issues having certain workpoints assigned to the human resources, tracked time spent completing issues, a number of issues being worked on in a certain time period, and an output of assignment of issues to the human resources. The training data may also include other inputs, such as issues having certain workpoints, human resources having certain skill levels, and amounts of time it takes the human resources to complete the issues, and an output of a time allocation to assign the types of issue having the certain workpoints being performed by the human resources having the skill levels.

In some embodiments, the trained machine learning model 154 may receive an input of an amount of time it takes an assignee having a certain skill level to complete an issue having a certain workpoint and output an updated skill level for the assignee. In some embodiments, the trained machine learning model 154 may receive an input of an amount of time it takes an assignee having a certain skill level to complete an issue having a certain workpoint and output a time allocation for the skill level of assignees and the workpoint of issues. In some embodiments, the trained machine learning model 154 may receive an input of human resources having certain skill levels, new issues having certain workpoints, tracked time it takes the human resources to complete issues having the certain workpoints, amount of issues currently assigned to the human resources, and/or total workpoints for issues assigned to the human resources, and output an assignment of the new issues to the human resources.

In some embodiments, the machine learning models 60 are linked such that their outputs are used as inputs to one another. For example, the skill level output by a first machine learning model 154 may be input into a second machine learning model 154 that outputs the time allotment or the assignment of a new issue to a human resource.

In some embodiments, the cloud-based computing system 116 may include an application programming interface (API) 135 that communicatively couples to the third party database 130 via the network 112. The API 135 may be implemented as computer instructions stored on one of the servers 128 and executed by a processing device of one of the servers 128. The third party database 130 may store data pertaining to human resources of an entity and amounts of time the human resources spend working on and completing issues for the entity. For example, the entity may be a law firm. The data in the third party database 130 may be harvested from computing devices of the human resources of the entity using tracking applications. The API 135 may extract the data from the third party database 130 to perform the techniques disclosed herein.

FIG. 2 illustrates an example user interface 200 for setting up default values for various parameters according to certain embodiments of this disclosure. The user interface 200 may be presented by the user portal 105 executing on the computing device 101 of the assignee. The user interface 200 may be presented to an administrator to enable the administrator to setup the default values for the parameters. The values may be numerical, alphanumerical, or any suitable format that is capable of representing separate levels and/or time allocations. The parameters may include a skill level, a workpoint, and expected time allotments per issue type based on a combination of the workpoints and skill level (individual resource capacity). The workpoints, skill level, time allotments for the individual resource capacity may be used to determine the current capacity allocation of issues to each human resource, as well as to forecast capacity needs for expected issues in the future.

As depicted, a first table 202 includes data pertaining to the skill level. The table 202 includes two columns: a "Skill Level" column and an "Assignee Level" column. The values for the skill levels include 1 for an entry level assignee, 2 for a junior level assignee, 3 for a mid-level assignee, 4 for a senior assignee, and 5 for an expert assignee. In some embodiments, the machine learning model 154 may be trained to assign the skill level to the assignees based on tracked data pertaining to an amount of time it takes the assignees to complete issue types having a certain workpoint. The skill levels may be stored in the database 129.

As depicted, a second table 204 includes data pertaining to the workpoints. The table 204 includes two columns: a "Workpoint" column and an "Amount of Effort" column. The values for the workpoints include 1 for route/task based (potential to automate) issues (e.g., takes an expert less than 15 minutes); 2 for issues requiring minor decisions with variables, rule based actions (e.g., takes an expert less than 2 hours); 3 for issues requiring some thoughtful decisions, some collaboration (e.g., takes an expert less than 8 hours); 4 for issues requiring some expertise or more complex collaboration (e.g., takes an expert less than 40 hours); and 5 for issues requiring a lot of expertise, intersecting decisions, collaboration, and/or multiple steps (e.g., takes an expert more than 40 hours). The workpoints may be assigned to certain types of issues (e.g., non-disclosure agreement, patent application, response to United States Patent and Trademark Office office action, contract, etc.) and stored in the database 129.

As depicted, a third table 206 includes data pertaining to an individual resource capacity which represents the expectation of allotted time to complete an issue type based on a combination of workpoints and skill level. For example, an issue type having a workpoint of 1 (e.g., routine/task based (potential to automate)) that is assigned to an assignee having a skill level of 1 (e.g., entry level) should take the assignee less than 2 hours (<2 hours) to complete. An issue type having a workpoint of 5 (e.g., requires a lot of expertise, intersecting decisions, collaboration, and/or multiple steps) that is assigned to the assignee having a skill level of 1 should take the assignee greater than 80 hours (>80 hours). An issue type having a workpoint of 1 that is assigned to an assignee having a skill level of 5 (e.g., expert) should take the assignee less than 15 minutes (<15 minutes). An issue type having a workpoint of 5 that is assigned to an assignee having a skill level of 5 should take the assignee greater than 40 hours (>40 hours). In some embodiments, the machine learning model 154 may be trained to adjust the time allocations in the table 206 based on tracked data pertaining to amounts of time it takes assignees having certain skill levels to complete issue types having certain workpoints. The data in the table 206 may be stored in the database 129.

Figure 3:
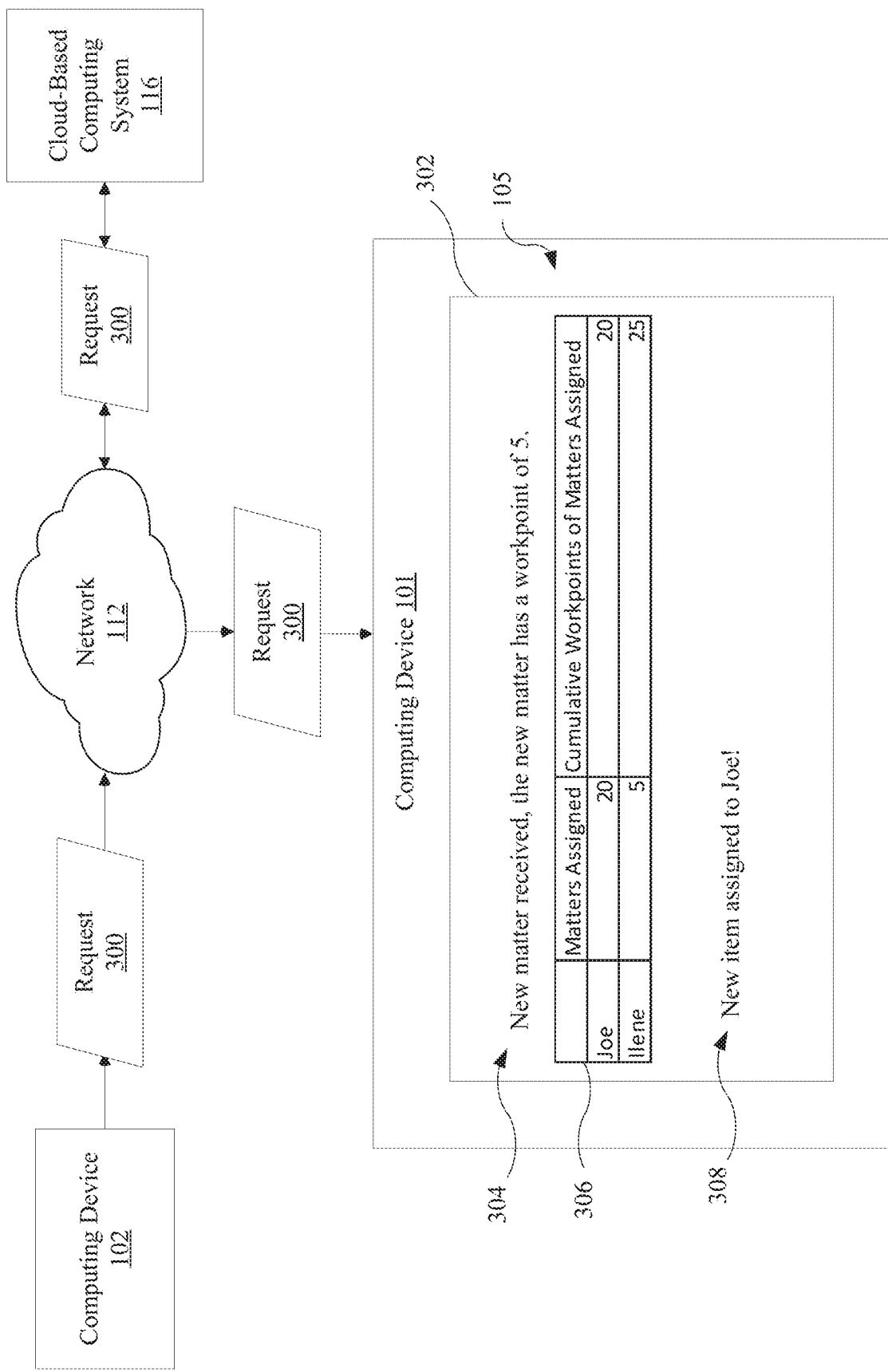
FIG. 3 illustrates a block diagram of an example workflow for electronically assigning a matter based on workpoints according to certain embodiments of this disclosure.

FIG. 3 illustrates a block diagram of an example workflow for electronically assigning a matter based on workpoints according to certain embodiments of this disclosure. A user may use the computing device 102 to transmit a request 300 to complete a matter to the cloud-based computing system 116 via the network 112. For example, an attorney at a law firm may prepare a non-disclosure agreement and email the non-disclosure agreement as an attachment to the API 135 of the cloud-based computing system 116.

The API 135 and/or the server 128 may process the 300 and cause a user interface 302 of the user portal 105 to present information pertaining to the request on the computing device 101. The API 135 and/or the server 128 may determine a type of the matter requested to be completed in the request 300 based on metadata or by analyzing content of the document that is attached in the request 300. For example, the text may be parsed to look for certain keywords that identify the type of the matter and/or object character recognition may be performed on the document to identify the type of the matter. Based on the identified type of matter, a corresponding workpoint may be electronically assigned to the matter based on the type of matter (e.g., drafting a patent application may be assigned a workpoint of 5).

The user interface 302 may include a statement 304 that indicates "New matter received, the new matter, the new matter has a workpoint of 5". The user interface 302 may also present a table 306 that includes the available assignees (e.g., Joe and Ilene) in one column, the number of matters assigned to the assignees in a second column, and the cumulative workpoints of matters assigned in a third column. The server 128 and/or the API 135 may query the database 129 to determine the number of matters assigned to each assignee and the cumulative workpoints of the matters assigned to the assignees. The server 128 and/or the API 135 may cause the information in the table 306 to populate.

As depicted, Joe is assigned to 20 matters that have a cumulative workpoints of 20. Thus, each matter assigned to Joe has a workpoint of 1, meaning that the matters involve routine/task based operations to complete. On the other hand, Ilene is assigned to 5 matters that have a cumulative workpoints of 100. Thus, each matter assigned to Ilene has a workpoint of 5. Accordingly, even though Joe is assigned more matters, Ilene is busier because of the complexity of the matters assigned to her. The server 128 and/or API 135 may assign the new matter to Joe to cause his cumulative workpoints of matters to increase to 25 (not shown), thereby equaling the workpoints of matters assigned to Ilene. As depicted, a statement 308 may indicate "New item assigned to Joe!".

Figure 4:
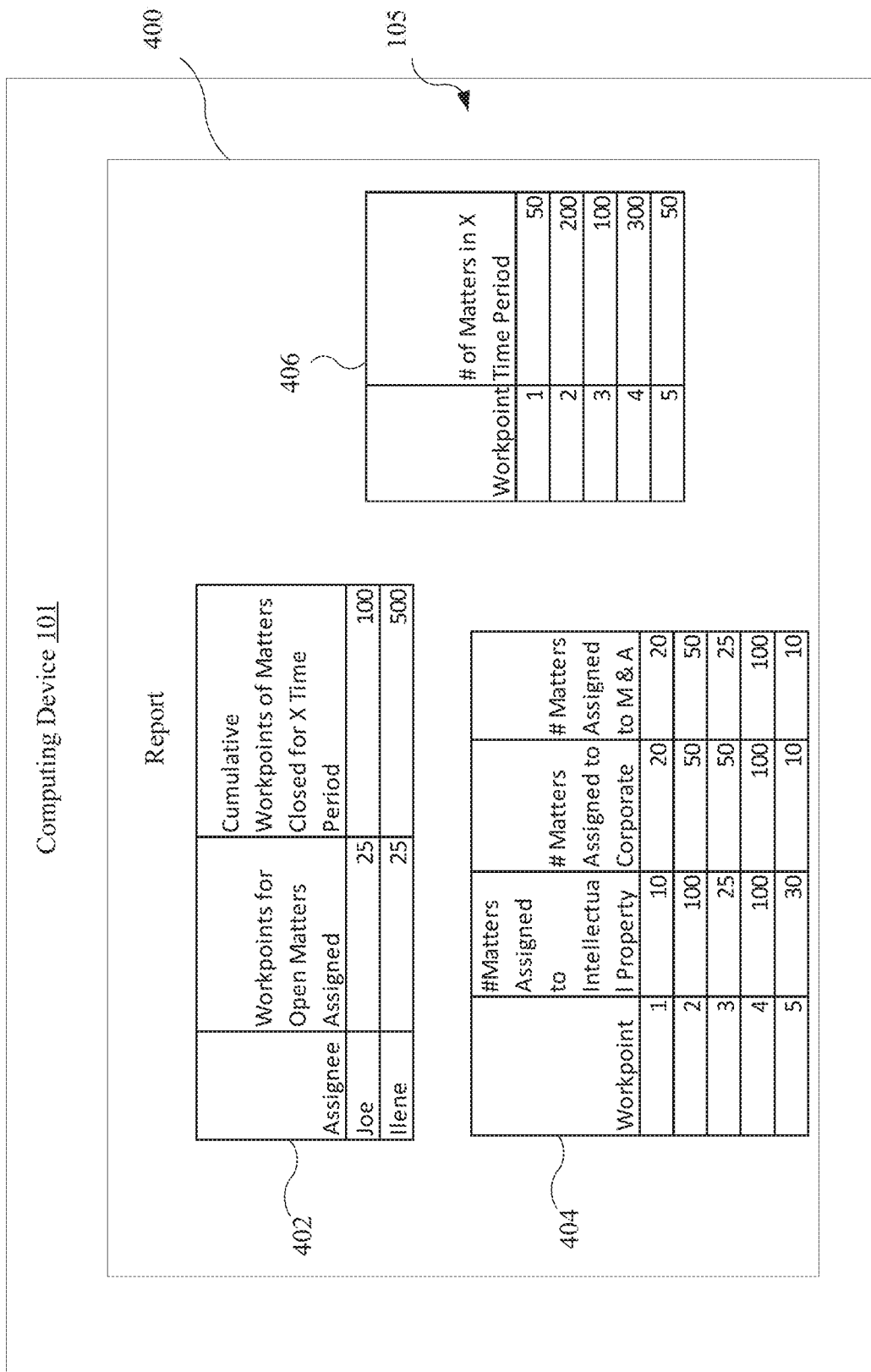
FIG. 4 illustrates an example user interface presenting various reports according to certain embodiments of this disclosure.

FIG. 4 illustrates an example user interface 400 presenting various reports according to certain embodiments of this disclosure. The user interface 400 may be presented by the user portal 105 executing on the computing device 101. The reports may be generated by the server 128 and/or the API 135 using data stored in the database 129. The reports may be transmitted by the server 128 and/or the API 135 for presentation on the user interface 400.

A first report may be presented in a first table 402. The first report may include a first column for the available assignees, a second column for workpoints for open matters assigned to each assignee, and a third column for cumulative workpoints of matters closed in a certain time period (e.g., month, quarter, year, etc.). As depicted, Joe has 25 workpoints for open matters assigned to him after the new matter was assigned to him as discussed above. Joe also has 100 cumulative workpoints of matters that were closed/completed in the certain time period. Ilene has 25 workpoints for open matters assigned to her, and Ilene has 500 cumulative workpoints of matters closed/completed for the certain time period.

A second report may be presented in a second table 404. The second report may enable comparing the complexity of issues that are assigned to each department of an entity. The second report may include a first column for workpoints (e.g., 1-5), a second column for a number of matters having a certain workpoint that are assigned to an Intellectual Property department of an entity, a third column for a number of matters having a certain workpoint that are assigned to a Corporate department of an entity, and a fourth column for a number of matters having a certain workpoint that are assigned to a Mergers and Acquisition department. As depicted, for the Intellectual Property department, the number of matters assigned having workpoint 1 is 10, having workpoint 2 is 100, having workpoint 3 is 25, having workpoint 4 is 100, and having workpoint 5 is 30. For the Corporate department, the number of matters assigned having workpoint 1 is 20, having workpoint 2 is 50, having workpoint 3 is 50, having workpoint 4 is 100, and having workpoint 5 is 10. For the Mergers and Acquisition department, the number of matters assigned having workpoint 1 is 20, having workpoint 2 is 50, having workpoint 3 is 25, having workpoint 4 is 100, and having workpoint 5 is 10.

Based on the data in the report in table 404, a determination may be made that the Intellectual Property department is handling more complex matters (e.g., 30) compared to the Corporate department (e.g., 10) and the Mergers and Acquisition department (e.g., 10). Such insights may enable an increased budget to be provided to the Intellectual Property department.

A third report may be presented in table 406. The third report may enable visualizing how many matters were assigned in each workpoint category. For example, the table 406 may include a first column for workpoints (1-5) and a second column for a number of matters assigned in a certain time period (e.g., monthly, quarterly, yearly). The number of matters for each workpoint may be determined by summing the number of matters assigned to each department for each workpoint. As a result, the number of matters assigned in the certain time period having a workpoint of 1 is 50, having a workpoint of 2 is 200, having a workpoint of 3 is 100, having a workpoint of 4 is 300, and having a workpoint of 5 is 50.

Figure 5:
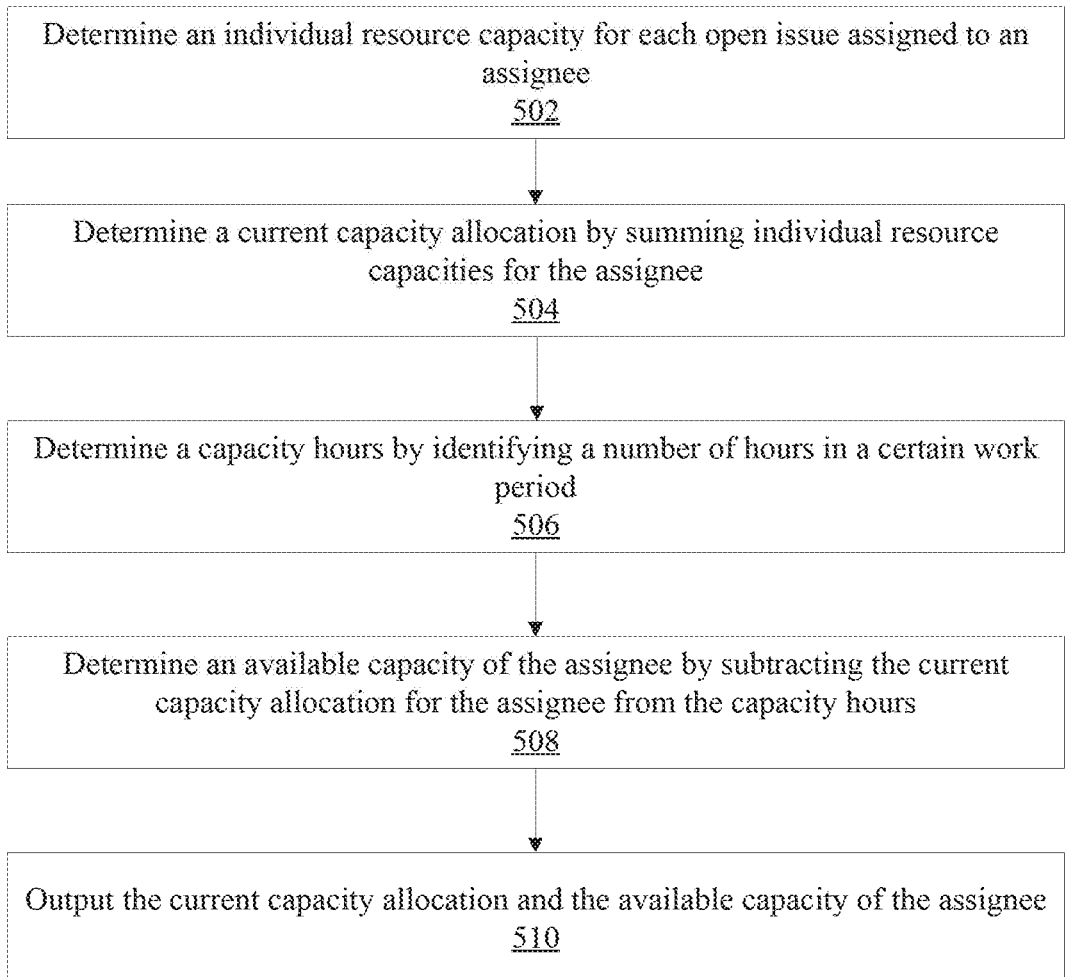
FIG. 5 illustrates example operations of a method for determining current capacity allocation and available capacity of an assignee according to certain embodiments of this disclosure.

FIG. 5 illustrates example operations of a method 500 for determining current capacity allocation and available capacity of an assignee according to certain embodiments of this disclosure. The method 500 may be performed by processing logic that may include hardware (circuitry, dedicated logic, etc.), software, or a combination of both. The method 500 and/or each of their individual functions, subroutines, or operations may be performed by one or more processors of a computing device (e.g., computing device 101, any component (server 128 and/or API 135) of cloud-based computing system 116 of FIG. 1) implementing the method 500. The method 500 may be implemented as computer instructions stored on a memory device and executable by the one or more processors. In certain implementations, the method 500 may be performed by a single processing thread. Alternatively, the method 500 may be performed by two or more processing threads, each thread implementing one or more individual functions, routines, subroutines, or operations of the methods. Various operations of the method 500 may be performed by the training engine 104 of FIG. 1.

At block 502, a processing device may determine an individual resource capacity for each open issue assigned to an assignee. The individual resource capacity may be based on a workpoint (e.g., 1-5) assigned to each open issue and a skill level (e.g., 1-5) of the assignee. The individual capacity resource may represent an expected time allotment for an assignee having a particular skill level to complete an issue having a particular workpoint. The workpoint may represent an amount of effort required to complete each open issue. In some embodiments, when an issue is requested to be completed, a type of the requested issue may be detected.

The processing device may allocate a workpoint to the requested issue based on the detected type. In some embodiments, determining the individual resource capacity for each open issue assigned to the assignee further comprises using a lookup table 206 that identifies amounts of time expected to complete types of issues based on the skill level of the assignee and the workpoint assigned to types of issues. In some embodiments, the processing device may use the individual resource capacity to determine future capacity needs for performing expected issues with the set of assignees.

In some embodiments, a machine learning model 154 may be used by the processing device to assign the skill level to the assignee. In some embodiments, the processing device may track activity on the computing device 102 of the assignee to determine an amount of time it takes the assignee to complete each open issue. In some embodiments, the processing device may receive data from the tracking application 111 executing on the computing device 102. The data may provide an indication of the amount of time the assignee spent completing each open issue, thereby causing the status of the open issue to change to closed. The processing device may use the machine learning model 154 to update the skill level of the assignee based on the amount of time it takes the assignee to complete each open issue.

Figure 6:
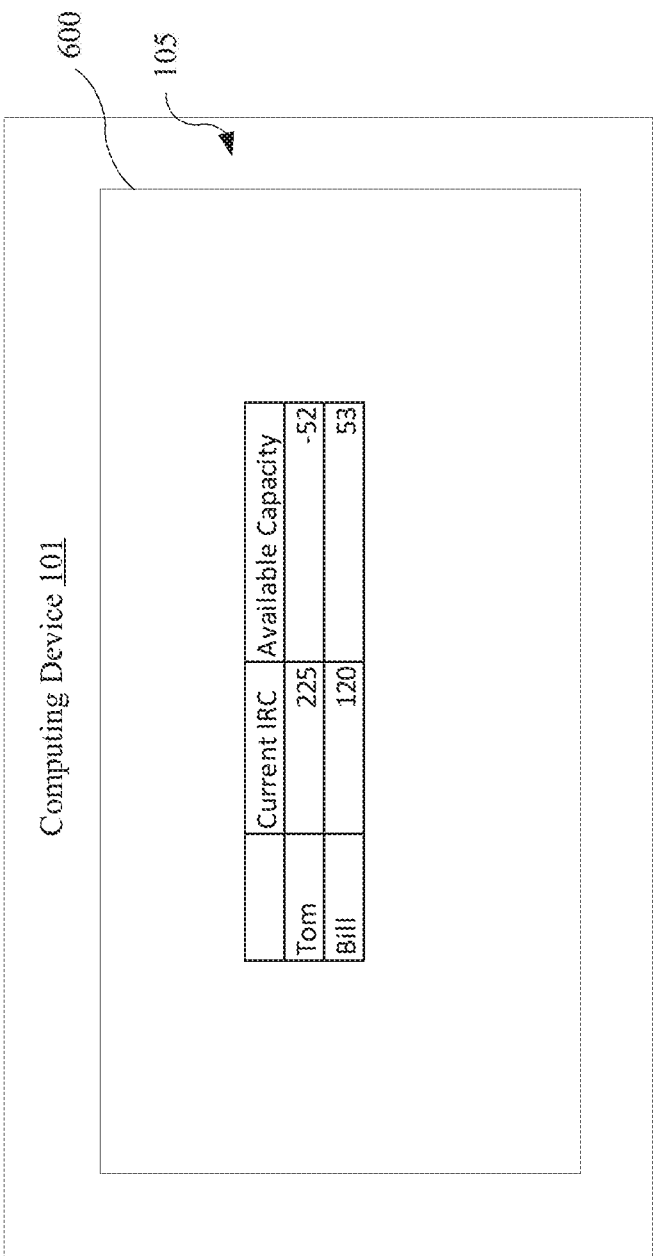
FIG. 6 illustrates an example user interface presenting the current capacity allocation and available capacity of assignees according to certain embodiments of this disclosure.

At block 504, the processing device may determine the current capacity allocation by summing individual resource capacities for the assignee. Take the following example, Tom has a skill level of 3 and Bill has a skill level of 5, and there are 30 issues open evenly assigned between Tom and Bill, each issue having a workpoint of 3. According to the table 206 in FIG. 2, the time allotment for workpoint 3 and skill level 3 is <15 hours. Thus, 15 hours times 15 assigned issues equals 225 for Tom for the current capacity allocation, as depicted in FIG. 6 by user interface 600 of the user portal 105 executing on the user device 101. According to the table 206 in FIG. 2, the time allotment for workpoint 3 and skill level 5 is <8 hours. Thus, 8 hours times 15 assigned issues equals 120 for Bill for the current capacity allocation, as depicted in FIG. 6 by the user interface 600.

Returning to FIG. 5, at block 506, the processing device may determine a capacity hours by identifying a number of hours in a certain work period (e.g., weekly, monthly, quarterly, yearly). In some embodiments, the user of the user portal 105 may input the number of hours in the certain work period. There may be a default configured to a certain number of hours (e.g., 173) in the certain work period.

At block 508, the processing device may determine the available capacity of the assignee by subtracting the current capacity allocation for the assignee from the capacity hours. Accordingly, as depicted in the table 600 in FIG. 6, subtracting 225 from 173 equals −52 for the available capacity for Tom, and subtracting 120 from 73 equals 52 for the available capacity for Bill.

Returning to FIG. 5, at block 510, the processing device may output the current capacity allocation and the available capacity of the assignee. The processing device may also use the current capacity allocation and the available capacity for the assignee to electronically assign an issue to the assignee. For example, Bill currently has available capacity to take on issues that can be performed within 53 hours. The processing device may electronically assign new issues to Bill, or reassign issues assigned to Tom to Bill, based on the available capacity until Bill's current capacity allocation increases and his available capacity decreases. A desired value for the available capacity for each assignee may be zero, thereby indicating the assignee is fully utilized, and is not under-utilized or overloaded with issues.

FIG. 7 illustrates example operations of a method 700 for capacity forecasting when assigning issues to a set of assignees according to certain embodiments of this disclosure. Method 700 includes operations performed by processors of a computing device (e.g., computing device 101, any component (server 128 and/or API 135) of cloud-based computing system 116 of FIG. 1) implementing the method 700. In some embodiments, one or more operations of the method 700 are implemented in computer instructions that stored on a memory device and executed by a processing device. The method 700 may be performed in the same or a similar manner as described above in regards to method 500.

At block 702, the processing device may determine expected issues by averaging a number of each issue type submitted to the cloud-based computing system 116 per a certain time period (e.g., weekly, monthly, quarterly, yearly) to predict a quantity of each issue type that will be submitted in a next time period. For example, month over month or year over year growth of issue types may be used to predict how many of each issue type may be submitted in the next month or next year. The issues may be submitted in requests to the cloud-based computing system 116 or may be entered by a user of the user portal 105 executing on the computing device 101.

Take the following example, there have been 3 issue types assigned monthly over the last 12 months: 15 issues having a first type with workpoint of 3, 10 issues having a second type with workpoint of 4, and 25 issues having a third type with workpoint of 1. There was a 33% growth in the workpoint 3 issues, 20% growth in the workpoint 4 issues, and 60% growth in the workpoint 1 issues. As such, the expected issues in this example would be 20 issues having the type with workpoint of 3, 12 issues having the type with workpoint of 4, and 40 issues having the type with workpoint of 1.

Figure 9:
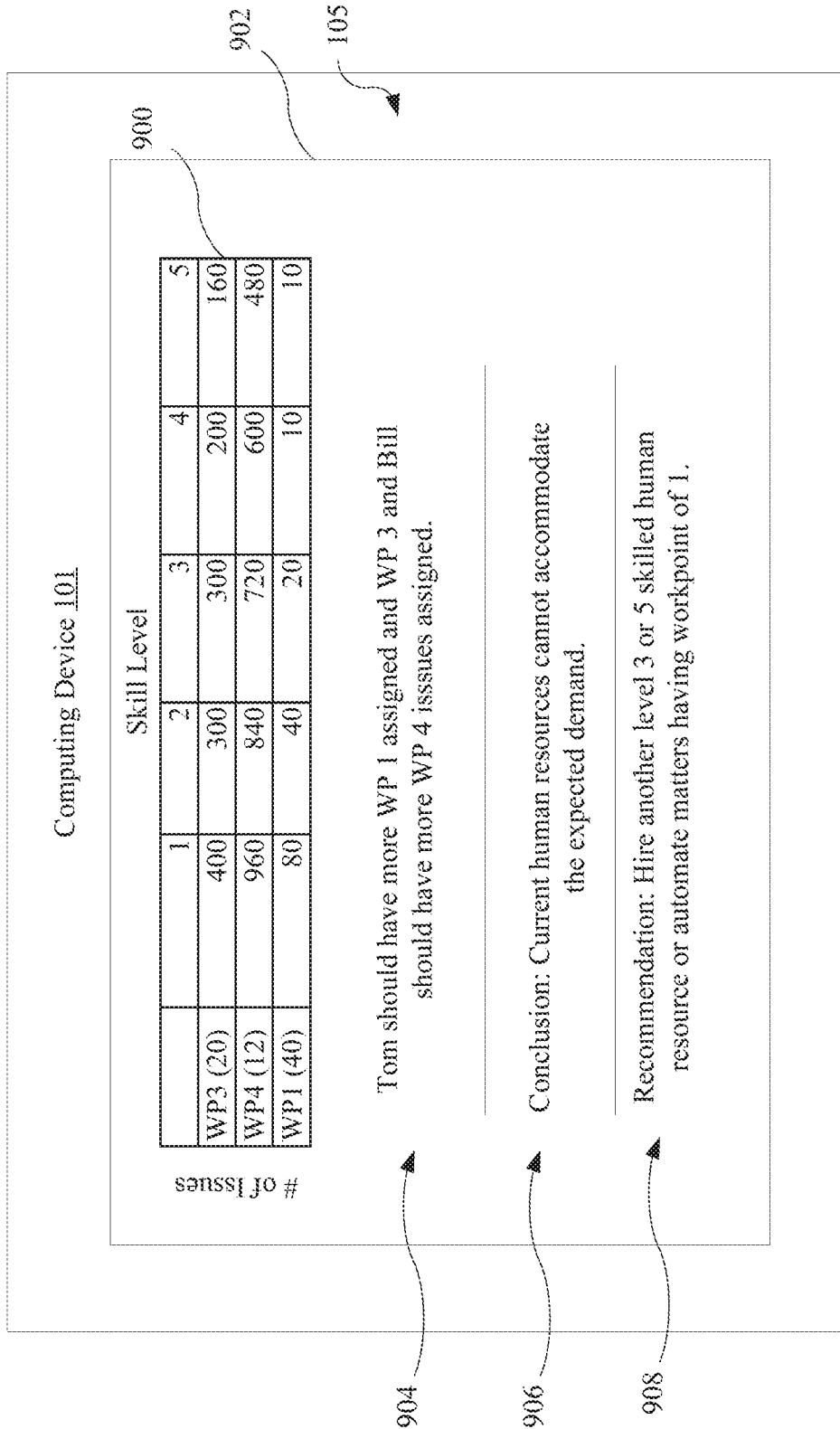
FIG. 9 illustrates an example user interface presenting an expected issue capacity need by skill level, assignments of matters, a conclusion, and a recommendation according to certain embodiments of this disclosure.

At block 704, the processing device may determine an expected issue capacity need in the future for each skill level of the set of assignees based on the expected issues. As depicted in FIG. 9 in table 900 presented in user interface 902 of the user portal 105 executing on the computing device 101, the expected issue capacity need in the future for each skill of the set of assignees based on the expected issues may be determined for issues having the type of each respective workpoint using the table 206 in FIG. 2. For example, the table 900 includes the skill levels (1-5) across the top row and the number of issues having the workpoints in the first column.

For 20 expected issues having the type with workpoint of 3, the expected issue capacity for skill level 1 is 400 (the time allotment for workpoint 3 and skill level 1 is 20 hours; 20 hours times 20 expected issues equals 400), for skill level 2 is 300 (the time allotment for workpoint 3 and skill level 2 is 15 hours; 15 hours times 20 expected issues equals 300), for skill level 3 is 300 (the time allotment for workpoint 3 and skill level 3 is 15 hours; 15 hours times 20 expected issues equals 300), for skill level 4 is 200 (the time allotment for workpoint 3 and skill level 4 is 10 hours; 10 hours times 20 expected issues equals 200), and for skill level 5 is 160 (the time allotment for workpoint 3 and skill level 5 is 8 hours; 8 hours times 20 expected issues equals 160).

For 12 expected issues having the type with workpoint of 4, the expected issue capacity for skill level 1 is 960 (the time allotment for workpoint 4 and skill level 1 is 80 hours; 80 hours times 12 expected issues equals 960), for skill level 2 is 840 (the time allotment for workpoint 4 and skill level 2 is 70 hours; 70 hours times 12 expected issues equals 840), for skill level 3 is 720 (the time allotment for workpoint 4 and skill level 3 is 60 hours; 60 hours times 12 expected issues equals 720), for skill level 4 is 600 (the time allotment for workpoint 4 and skill level 4 is 50 hours; 50 hours times 12 expected issues equals 600), and for skill level 5 is 480 (the time allotment for workpoint 4 and skill level 5 is 40 hours; 40 hours times 12 expected issues equals 480).

For 40 expected issues having the type with workpoint of 1, the expected issue capacity for skill level 1 is 80 (the time allotment for workpoint 1 and skill level 1 is 2 hours; 2 hours times 40 expected issues equals 400), for skill level 2 is 40 (the time allotment for workpoint 1 and skill level 2 is 1 hour; 1 hour times 40 expected issues equals 40), for skill level 3 is 20 (the time allotment for workpoint 1 and skill level 3 is 0.5 hours; 0.5 hours times 40 expected issues equals 20), for skill level 4 is 10 (the time allotment for workpoint 1 and skill level 4 is 0.25 hours; 0.25 hours times 40 expected issues equals 10), and for skill level 5 is 10 (the time allotment for workpoint 1 and skill level 5 is 0.25 hours; 0.25 hours times 40 expected issues equals 10).

Returning to FIG. 7, at block 706, the processing device may determine assignee demand by averaging a number of each issue type assigned to each assignee of the set of assignees per the certain time period. For example, the processing device may average the number of each issue type per month over the last 12 months that have been assigned to each assignee of the set of assignees.

At block 708, for each assignee of the set of assignees, the processing device may determine (block 710) an expected assignee demand by identifying a number of the expected issues on which each assignee will be expected to work based on the expected issues and the assignee demand, determine (block 712) an expected individual capacity based on the expected assignee demand, and determine (block 714) assignments of one or more issues to the assignee based on the expected issue capacity and the expected individual capacity.

In some embodiments, determining (block 710) the expected assignee demand by identifying the number of expected issues on which each assignee will be expected to work may include dividing the expected issues by the assignee demand. Continuing the Tom and Bill example described above, of the submitted issues, over the certain time period (e.g., last 12 months), Tom was assigned 5 issues having a type with workpoint 3, 5 issues having a type with workpoint 4, and 15 issues having a type with workpoint 1. Bill was assigned 10 issues having a type with workpoint 3, 5 issues having a type with workpoint 4, and 10 issues having a type with workpoint 1. Accordingly, the expected assignee demand for Tom would be 7 issues having a type with workpoint 3, 6 issues having a type with workpoint 4 issues, and 24 issues having a type with workpoint 1. The expected assignee demand for Bill would be 13 issues having a type with workpoint 3, 6 issues having a type with workpoint 4 issues, and 15 issues having a type with workpoint 1.

Figure 8:
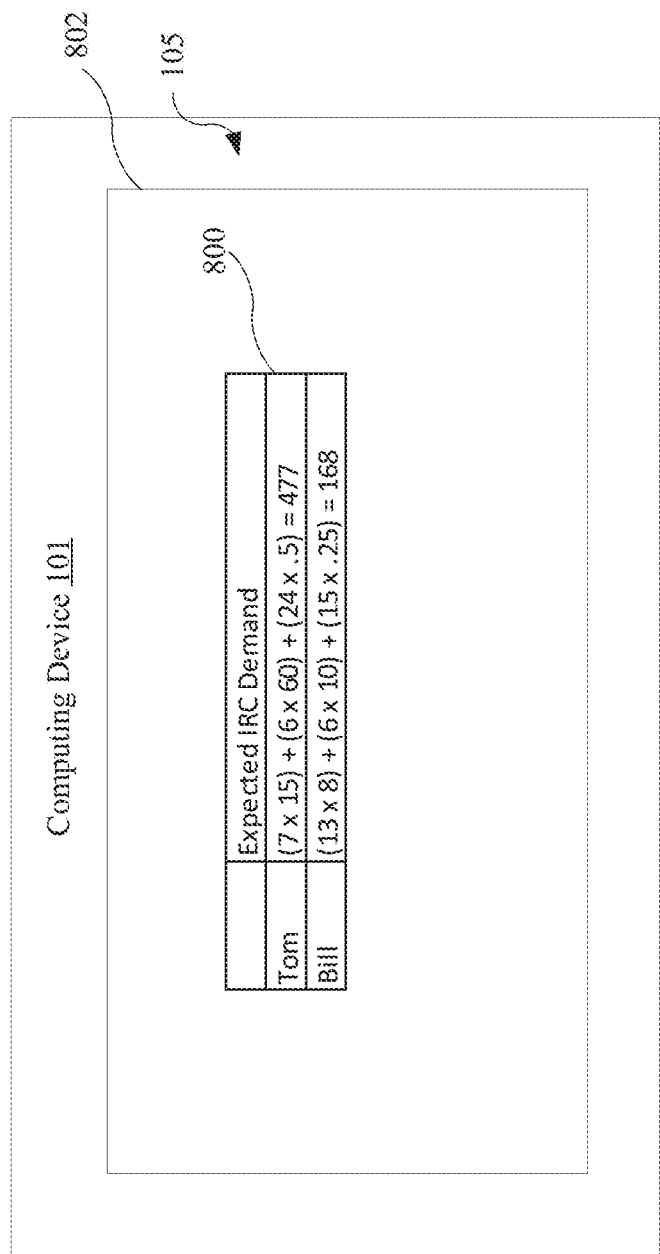
FIG. 8 illustrates an example user interface presenting expected assignee demands for a set of assignees according to certain embodiments of this disclosure.

In some embodiments, determining (block 712) the expected individual capacity further includes applying an individual resource capacity equation to the expected assignee demand, as presented in FIG. 8 in table 800 of user interface 802 of the user portal 105 executing on the computing device 101. The table 206 in FIG. 2 may be used to determine various parameters in the individual resource capacity equation depicted in the "Expected IRC Demand" column in table 800 of FIG. 8. For example, Tom is skill level 3, and for workpoint 3, the time allotment is 15; for workpoint 4, the time allotment is 60; and for workpoint 1, the time allotment is 0.5 hours (30 minutes). Thus, the expected individual capacity for Tom is $(7 \times 15)+(6 \times 60)+(24 \times 0.5)=477$. Bill is skill level 5, and for workpoint 3, the time allotment is 8; for workpoint 4, the time allotment is 10; and for workpoint 1, the time allotment is 0.25 hours (15 minutes). Thus, the expected individual capacity for Bill is $(13 \times 8)+(6 \times 10)+(15 \times 0.25)=168$.

In some embodiments, determining (block 714) one or more assignments of one or more issues to the assignee based on the expected issue capacity and the expected individual capacity may include performing an algorithm to optimize the assignments of expected issues having certain workpoint with current skill level in the expected issue capacity in table 900 in FIG. 9 and the expected individual capacity in table 800 in FIG. 8 for each assignee. As a result, the processing device may determine that Tom, who has an expected individual capacity of 477, should have more issues having a type with workpoint 1 (there are 300 in the expected issue capacity table 900 for skill level 3) assigned and more issues having a type with workpoint 3 (there are 720 in the expected issue capacity table 900 for skill level 3). The processing device may determine that Bill, who has an expected individual capacity of 168, should have more issues having a type with workpoint 4 (there are 480 in the expected issue capacity table 900 for skill level 5) assigned. Accordingly, a statement 904 may be presented in the user interface 902 that states "Tom should have more WP 1 assigned and WP 3 and Bill should have more WP 4 issues assigned." In this way, the expected issues having various complexity according to their workpoints may be distributed to the proper assignee having the proper skill level to handle the expected issues.

Although Bill and Tom may be able to handle some of the expected issue capacity based on their expected individual capacity, it should be understood that there are still expected issue capacities for the workpoints 3, 4, and 1 and the skill level 3 (Tom) and 5 (Bill) in the table 900 that Bill and Tom cannot handle. Accordingly, a conclusion 906 may be presented indicating "Current human resources cannot accommodate the expected demand." Further a recommendation 908 may be presented indicating "Hire another level 3 or 5 skilled human resource or automate matters having workpoint of 1." Matters having a workpoint of 1 may be automated in some instances because they include routine/task based operations.

In some embodiments, the processing device may obtain a cumulative expected individual capacities of the set of assignees by aggregating each expected individual capacity for each assignee, determine whether any issue type in the expected issue capacity requires more capacity than available in the cumulative expected individual capacities of the set of assignees, and provide a recommendation to hire at least an additional assignee to work on the issue type in the expected issue capacity that requires more capacity than is available in the cumulative expected individual capacities of the assignees.

In some embodiments, the processing device may monitor an amount of time it takes an assignee having a skill level representing an expert to complete a type of issue by harvesting data from the computing device 102 of the assignee. The processing device may use a machine learning 154 model to update a workpoint value for the type of issue based on the amount of time. Further, the processing device may monitor the amount of time it takes each assignee to complete a type of issue by harvesting data from the computing device 102 of each assignee. The processing device may use the machine learning model 154 to update the skill level assigned to each assignee for that type of issue based on the amount of time. Harvesting the data from the computing device 102 may include monitoring an amount of time the third party application 107 is being utilized by the computing device of each assignee. The monitoring may be enabled by receiving data from the tracking application 111 that is executing on the computing device 102.

Figure 10:
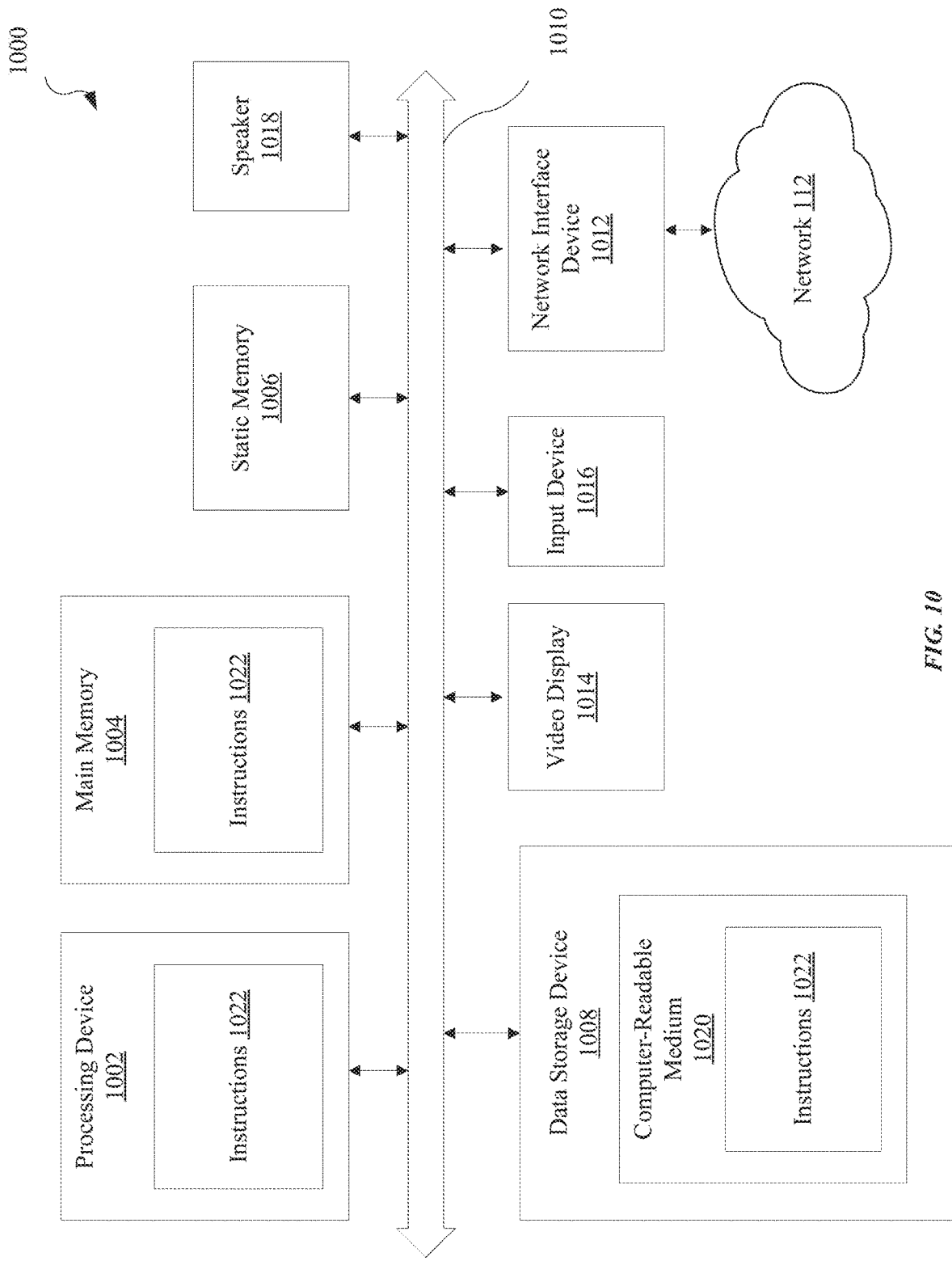
FIG. 10 illustrates an example computer system.

FIG. 10 illustrates an example computer system 1000, which can perform any one or more of the methods described herein. In one example, computer system 1000 may correspond to the computing device 101, the computing device 102, one or more servers 128 of the cloud-based computing system 116, or one or more training engines 152 of the cloud-based computing system 16 of FIG. 1. The computer system 1000 may be capable of executing the user portal 105, the tracking application 111, or the third party application 107 of FIG. 1. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a wearable (e.g., wristband), a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1000 includes a processing device 1002, a main memory 1004 (e.g., read-only memory (ROM), solid state drive (SSD), flash memory, dynamic random access memory (DRAM) such as synchronous DRAM (SDRAM)), a static memory 1006 (e.g., solid state drive (SSD), flash memory, static random access memory (SRAM)), and a data storage device 1008, which communicate with each other via a bus 1010.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing any of the operations and steps discussed herein.

The computer system 1000 may further include a network interface device 1012. The computer system 1000 also may include a video display 1014 (e.g., a liquid crystal display (LCD) or a cathode ray tube (CRT)), one or more input devices 1016 (e.g., a keyboard and/or a mouse), and one or more speakers 1018 (e.g., a speaker). In one illustrative example, the video display 1014 and the input device(s) 1016 may be combined into a single component or device (e.g., an LCD touch screen).

The data storage device 1016 may include a computer-readable medium 1020 on which the instructions 1022 (e.g., implementing the application programming interface 135, the user portal 105, the tracking application 111, the third party application 107, and/or any component depicted in the FIGURES and described herein) embodying any one or more of the methodologies or functions described herein are stored. The instructions 1022 may also reside, completely or at least partially, within the main memory 1004 and/or within the processing device 1002 during execution thereof by the computer system 1000. As such, the main memory 1004 and the processing device 1002 also constitute computer-readable media. The instructions 1022 may further be transmitted or received over a network via the network interface device 1012.

While the computer-readable storage medium 1020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The invention claimed is:

1. A method for capacity forecasting when assigning issues to a plurality of assignees, the method comprising:
   training, using training data, a machine learning model to determine skill levels for a plurality of assignees, wherein the training data comprises (i) inputs including first amounts of time it takes the plurality of assignees to complete certain types of issues having certain complexity values and (ii) outputs including skill levels to assignee the plurality of assignees;
   receiving data from tracking applications executing on computing devices of the plurality of assignees, wherein:
      the tracking applications monitor amounts of time other applications are actively executed by processing devices of the computing devices of the plurality of assignees,
      the data includes the amounts of time the other applications are actively executed by the processing devices of the computing devices to complete issues having certain complexity values;
   determining, using the machine learning model, updated skill levels for the plurality of assignees based on the amounts of time the other applications are actively executed to complete the issues having the certain complexity values;
   determining expected issues by averaging a number of each issue type submitted per a certain time period to predict a quantity of each issue type that will be submitted in a next time period;
   determining an expected issue capacity need in the future for each skill level of the updated skill levels of the plurality of assignees based on the expected issues;
   determining assignee demand by averaging a number of each issue type assigned to each assignee of the plurality of assignees per the certain time period;
   for each assignee of the plurality of assignees:
      determining an expected assignee demand by identifying a number of the expected issues on which each assignee will be expected to work based on the expected issues and the assignee demand;
      determining an expected individual capacity based on the expected assignee demand; and determining one or more assignments of one or more issues to the assignee based on the expected issue capacity and the expected individual capacity.

2. The method of claim 1, wherein determining the expected assignee demand by identifying the number of expected issues on which each assignee will be expected to work further comprises dividing the expected issues by the assignee demand.

3. The method of claim 1, wherein determining the expected individual capacity further comprises applying an individual resource capacity equation to the expected assignee demand.

4. The method of claim 1, further comprising:
obtaining a cumulative expected individual capacities of the plurality of assignees by aggregating each expected individual capacity for each assignee;
determining whether any issue type in the expected issue capacity requires more capacity than available in the cumulative expected individual capacities of the plurality of assignees; and
providing a recommendation to hire at least an additional assignee to work on the issue type in the expected issue capacity that requires more capacity than is available in the cumulative expected individual capacities of the assignees.

5. The method of claim 1, further comprising:
monitoring an amount of time it takes an assignee having a skill level representing an expert to complete a type of issue by harvesting data from a computing device of the expert assignee; and
using a second machine learning model to update a workpoint value for the type of issue based on the amount of time, wherein the workpoint value represents a complexity of the type of issue.

6. A tangible, non-transitory computer-readable medium storing instructions that, when executed, cause a processing device to:
train, using training data, a machine learning model to determine skill levels for a plurality of assignees, wherein the training data comprises (i) inputs including first amounts of time it takes the plurality of assignees to complete certain types of issues having certain complexity values and (ii) outputs including skill levels to assignee the plurality of assignees;
receive data from tracking applications executing on computing devices of a plurality of assignees, wherein:
the tracking applications monitor amounts of time other applications are actively executed by processing devices of the computing devices of the plurality of assignees,
the data includes the amounts of time the other applications are actively executed by the processing devices of the computing devices to complete issues having certain complexity values;
determine, using the machine learning model, updated skill levels for the plurality of assignees based on the amounts of time the other applications are actively executed to complete the issues having the certain complexity values;
determine expected issues by averaging a number of each issue type submitted per a certain time period to predict a quantity of each issue type that will be submitted in a next time period;
determine an expected issue capacity need in the future for each skill level of the updated skill levels of the plurality of assignees based on the expected issues;
determine assignee demand by averaging a number of each issue type assigned to each assignee of the plurality of assignees per the certain time period;
for each assignee of the plurality of assignees:
determine an expected assignee demand by identifying a number of the expected issues on which each assignee will be expected to work based on the expected issues and the assignee demand;
determine an expected individual capacity based on the expected assignee demand; and
determine one or more assignments of one or more issues to the assignee based on the expected issue capacity and the expected individual capacity.

7. The computer-readable medium of claim 6, wherein determining the expected assignee demand by identifying the number of expected issues on which each assignee will be expected to work further comprises dividing the expected issues by the assignee demand.

8. The computer-readable medium of claim 6, wherein determining the expected individual capacity further comprises applying an individual resource capacity equation to the expected assignee demand.

9. The computer-readable medium of claim 6, wherein the processing device is further to:
obtain a cumulative expected individual capacities of the plurality of assignees by aggregating each expected individual capacity for each assignee;
determine whether any issue type in the expected issue capacity requires more capacity than available in the cumulative expected individual capacities of the plurality of assignees; and
provide a recommendation to hire at least an additional assignee to work on the issue type in the expected issue capacity that requires more capacity than is available in the cumulative expected individual capacities of the assignees.

10. The computer-readable medium of claim 6, wherein the processing device is further to:
monitor an amount of time it takes an expert assignee to complete a type of issue by harvesting data from a computing device of the expert assignee; and
use a second machine learning model to update a workpoint value for the type of issue based on the amount of time, wherein the workpoint value represents a complexity of the type of issue.

11. A system, comprising:
a memory device storing instructions;
a processing device communicatively coupled to the memory device, wherein the processing device executes the instructions to:
train, using training data, a machine learning model to determine skill levels for a plurality of assignees, wherein the training data comprises (i) inputs including first amounts of time it takes the plurality of assignees to complete certain types of issues having certain complexity values and (ii) outputs including skill levels to assignee the plurality of assignees;
receive data from tracking applications executing on computing devices of a plurality of assignees, wherein:
the tracking applications monitor amounts of time other applications are actively executed by processing devices of the computing devices of the plurality of assignees,
the data includes the amounts of time the other applications are actively executed by the processing devices of the computing devices to complete issues having certain complexity values;

determine, using the machine learning model, updated skill levels for the plurality of assignees based on the amounts of time the other applications are actively executed to complete the issues having the certain complexity values;

determine expected issues by averaging a number of each issue type submitted per a certain time period to predict a quantity of each issue type that will be submitted in a next time period;

determine an expected issue capacity need in the future for each skill level of the updated skill levels of the plurality of assignees based on the expected issues;

determine assignee demand by averaging a number of each issue type assigned to each assignee of the plurality of assignees per the certain time period;

for each assignee of the plurality of assignees:
    determine an expected assignee demand by identifying a number of the expected issues on which each assignee will be expected to work based on the expected issues and the assignee demand;
    determine an expected individual capacity based on the expected assignee demand; and
    determine one or more assignments of one or more issues to the assignee based on the expected issue capacity and the expected individual capacity.

12. The system of claim 11, wherein determining the expected assignee demand by identifying the number of expected issues on which each assignee will be expected to work further comprises dividing the expected issues by the assignee demand.

13. The system of claim 11, wherein determining the expected individual capacity further comprises applying an individual resource capacity equation to the expected assignee demand.

14. The system of claim 11, wherein the processing device is further to:
    obtain a cumulative expected individual capacities of the plurality of assignees by aggregating each expected individual capacity for each assignee;
    determine whether any issue type in the expected issue capacity requires more capacity than available in the cumulative expected individual capacities of the plurality of assignees; and
    provide a recommendation to hire at least an additional assignee to work on the issue type in the expected issue capacity that requires more capacity than is available in the cumulative expected individual capacities of the assignees.

15. The system of claim 11, wherein the processing device is further to:
    monitor an amount of time it takes an expert assignee to complete a type of issue by harvesting data from a computing device of the expert assignee; and
    use a second machine learning model to update a workpoint value for the type of issue based on the amount of time, wherein the workpoint value represents a complexity of the type of issue.

* * * * *